May 14, 1963 F. H. HUMPHREY 3,089,180
DEVICE FOR MIXING AND APPLYING LIQUIDS
Filed June 16, 1961 2 Sheets-Sheet 1

Inventor
FREDERICK H. HUMPHREY
by:
Attorney

United States Patent Office 3,089,180
Patented May 14, 1963

1

3,089,180
DEVICE FOR MIXING AND APPLYING LIQUIDS
Frederick H. Humphrey, Markham, Ontario, Canada
Filed June 16, 1961, Ser. No. 117,653
11 Claims. (Cl. 15—525)

This invention relates to a device for mixing and applying liquids. More particularly, this invention relates to a roller type device for mixing and applying liquids. Even more particularly, this invention relates to a roller type device for mixing and applying liquid resins.

Two part resin systems are becoming widely used in industry. In such systems two containers are provided. In one container there is a liquid resin which has a catalyst added which alone will not cause the resin to solidify and cure. In the other container there is a liquid resin which has a promoter added which also alone will not cause the resin to solidify. However, when the catalyzed and promoted resins are mixed, the interaction between the catalyst and the promotor causes the liquid resin to solidify and cure at room temperatures to a hard infusible solid. The use of such two part resin systems is prevalent for example in the making of glass fibre reinforced plastic structures such as plastic boats, storage tanks, etc.

In the past, in order to mix the catalyzed and promoted resins, two part resin systems have employed double headed spray guns which atomize equal portions of catalyzed and promoted resins and deposit the spray mixture on glass fibres. Such spray systems have not proved satisfactory for a number of reasons. In the first place they are limited in the degree of viscosity of the resin being applied. Heavy or extremely viscous resins have many advantageous chemical and physical characteristics but these cannot be sprayed. In addition resins with a high degree of filler which possess obvious economic advantages as well as physical and chemical advantages are also in many cases too viscous to be sprayed. In addition, in spraying, a large amount of resin is lost to the atmosphere by evaporation which not only is wasteful but also creates explosive hazards. Spraying also results in the loss of resin by overspraying, a certain amount of which is inevitable. Because some promoters are toxic, inhalation of the vapours thereof by workmen must be avoided. This requires that fresh air must be supplied to the workmen. In many cases it is difficult to supply fresh air to the workmen. It has been found that spray systems do not permit the resin to work into the glass fibres. Moreover such systems with their metering controls are expensive and are difficult to clean and maintain.

A device embodying my invention overcomes the foregoing disadvantages and other disadvantages of two part resin spray systems. In brief, a device embodying my invention comprises a plurality of circular discs closely stacked side by side and each having an aperture positioned centrally therein. Disc mounting means extend through the apertures in the discs, the discs being individually rotatably mounted on the disc mounting means. Retaining means are provided to retain the discs on the disc mounting means and to preclude any substantial longitudinal movement of the discs thereon. At least two separate liquid headers are formed adjacent parts of the surfaces defining the apertures. Means are provided to supply a liquid to each of the headers.

My invention will now be described in greater detail

2 with reference to the accompanying drawings, in which:

Figures 1, 2:
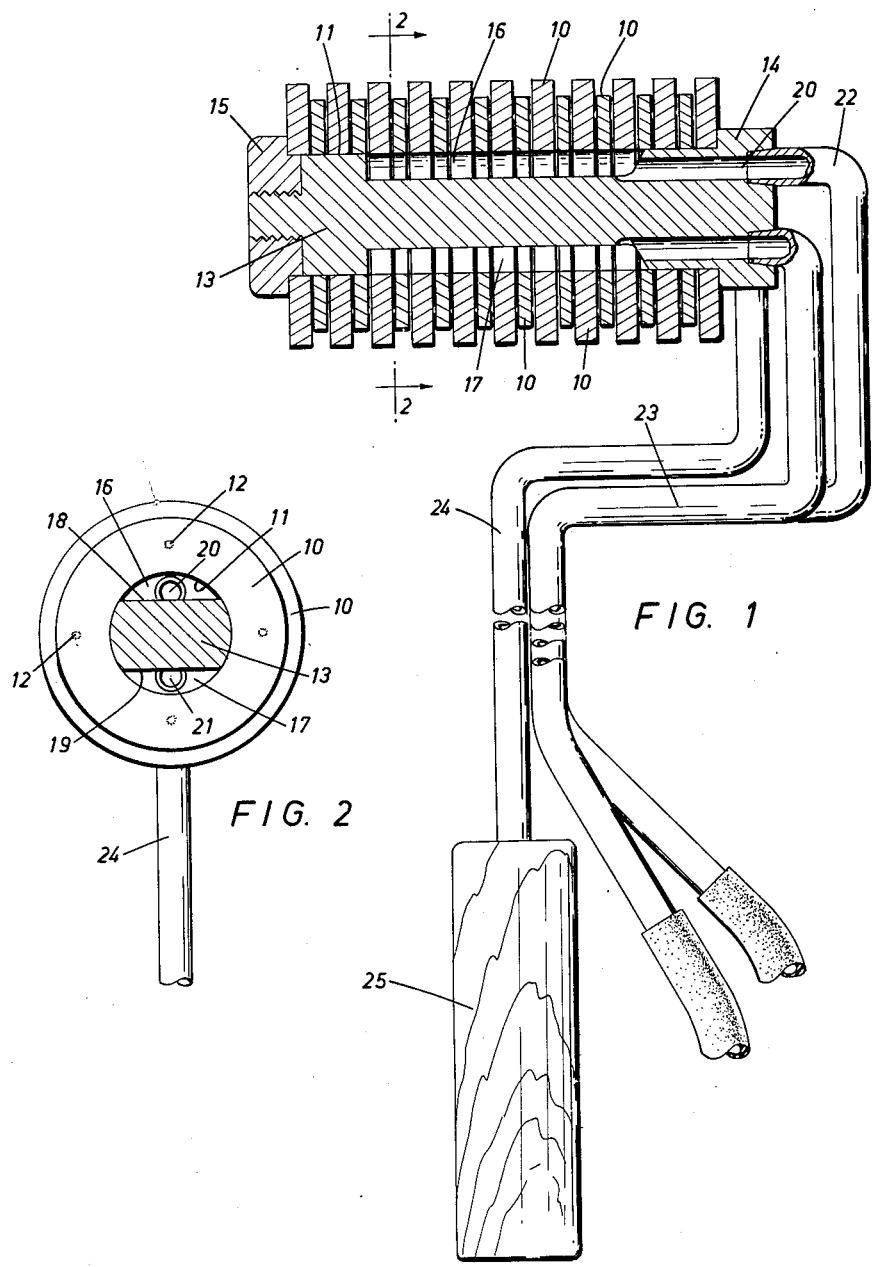
FIGURE 1 is a side elevation, partly in section, of a device embodying my invention.
FIGURE 2 is a complete section taken along line 2—2 in FIGURE 1.

Referring to the embodiment of the invention illustrated in FIGURES 1 and 2, I have shown a plurality of discs 10 which are closely stacked side by side. Each disc 10 has an aperture 11 positioned centrally therein. Two types of discs are provided, roller discs and spacer discs. A spacer disc is positioned between each pair of roller discs. The roller discs are all of the same diameter and are of a larger diameter than the spacer discs, which are also all of the same diameter. In addition, the roller discs are thicker than the spacer discs. Both the roller discs and spacer discs are preferably made of metal, but could be made of any other suitable material such as chemically resistant plastic, for example, nylon. Preferably on both surfaces of each spacer disc there are provided slightly raised protuberances 12 which prevent the surfaces of adjacent discs from coming into such close contact that liquid resin cannot pass therebetween. Discs 10 are individually rotatably mounted on disc mounting means in the form of a shaft 13 which extends through apertures 11. Retaining means are provided to retain the discs on shaft 13 and preclude any substantial longitudinal movement of the discs thereon. These retaining means consist of a shoulder 14 adjacent one end of shaft 13 and a cap 15 threadably engaging the other end of shaft 13. The position of cap 15 may be adjusted to determine the degree of freedom that discs 10 possess to rotate on shaft 13.

As aforementioned, the spacer discs and roller discs are of different diameters, and thus, as is best seen in FIGURE 1, a plurality of annular channels are formed at the periphery of the discs. These channels serve two functions. When resin is applied to glass or other reinforcing fibres, air bubbles are trapped under the resin surface. The large rollers cause a downward pressure which causes the bubbles to be displaced to the area under the spacer discs where they are forced to the surface of the laminate. The resulting laminate is relatively void free. In addition the channels tend to prevent resin which has already been applied to the surface from being drawn up by the device as it rolls over the resin.

Two separate liquid headers 16 and 17 are provided adjacent to parts of the surfaces defining apertures 11. In the embodiment illustrated, shaft 13 has two flat surfaces 18 and 19, and headers 16 and 17 are formed between these flat surfaces and parts of the surfaces defining apertures 11. It will be appreciated that where more than two components are to be mixed, more than two headers may be provided. A pair of passages 20 and 21 are provided in shaft 13. Passages 20 and 21 communicate in fluid flow relationship with headers 16 and 17 respectively. Connected to passages 20 and 21 in fluid flow relationship are tubes 22 and 23 respectively.

A handle 24 is secured to shaft 13 and has hand gripping means 25.

In the operation of the device, tubes 22 and 23 are connected through a metering pump to a source of promoted resin and a source of catalyzed resin respectively. The metering pump is adjusted so that the flow rates through each tube are the same or are in the required rate. In the embodiment shown the operator grips handle 24 and rolls the roller discs back and forth over the surface to be treated. Promoted resin in header 16 and catalyzed resin in header 17 exude outwardly between discs 10 toward the periphery of the discs. As the discs roll back and forth, promoted resin which occupies the space between discs 10 adjacent header 16 is carried to a position opposite header 17 where it is mixed with catalyzed resin exuding from header 17, and similarly catalyzed resin between discs 10 adjacent header 17 is carried to a posiiton adjacent header 16 where it is mixed with promoted resin. Since this interaction and mixing takes place with great rapidity as the device is rolled over the surface to be treated, excellent mixing of the catalyzed and promoted resins is achieved by the time that the resins travel from the headers to the applying surface of the device.

Figure 3:
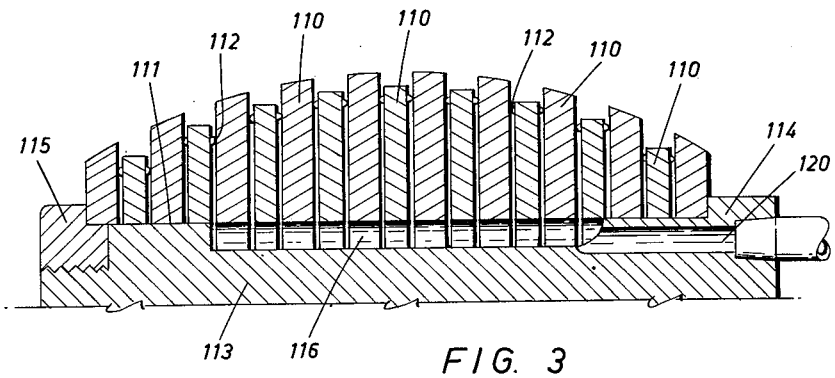
FIGURE 3 is a side elevation of a portion of a roller constructed in accordance with an alternate embodiment of this invention in which the roller surface is contoured.

It will be obvious that the applying surface, i.e. that provided by the roller discs may be contoured for any particular application rather than being straight as in the embodiment shown in FIGURE 1. In FIGURE 3, a cross section of a portion of a roller is shown in which the diameter of the roller discs decreases towards both ends from the centre thereof and the surface of the rollers in addition is so shaped as to provide a contoured roller of curved section. Such a roller would be useful in such applications as boat building in which the roller discs are contoured or shaped to fit a particular surface in which the resin is to be applied. All other parts of the roller illustrated in FIGURE 3 remain as already described with reference to FIGURE 1.

Figure 4:
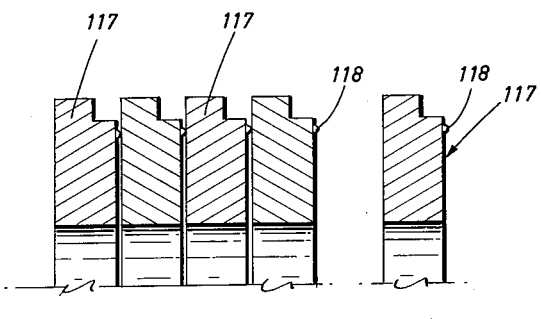
FIGURE 4 is a vertical cross section of a further alternative construction of the rollers and spacer discs forming part of this invention.

According to a further embodiment of this invention illustrated in FIGURE 4, instead of providing separate roller and spacer discs, a single disc 117 having a stepped down shoulder providing the same spacing and channel effect with adjacent discs may be used. In this case the spacer disc is in effect an integral part of the roller disc. It has been found that such a disc while it does not provide the same intimate degree of mixing as that illustrated in FIGURE 1 does provide an acceptable mixing and application of the resin. It will also be appreciated that while the invention has been described as a hand tool, this is not necessarily a limitation of the invention. The principle of the invention can be incorporated into a machine tool for automatic application.

Those skilled in the art will realize that while I have described a preferred embodiment of my invention, changes and modifications may be made therein without departing from the spirit and scope of my invention as defined in the appended claims.

What I claim as my invention is:

1. A device for mixing and applying liquids comprising a plurality of circular discs closely stacked side by side and each having an aperture positioned centrally therein, disc mounting means extending through the apertures in said discs, said discs being individually rotatably mounted on said disc mounting means about the longitudinal axis thereof, the diameter of said apertures being at least substantially the same as the diameter of said disc mounting means, said discs thereby being precluded from any substantial degree of lateral movement with respect to said longitudinal axis by engagement of said disc mounting means with the walls defining said apertures, the peripheral surface of said device remote from said disc mounting means having a plurality of longitudinally spaced apart peripheral annular channels formed therein in every position of said discs, retaining means retaining said discs on said disc mounting means and precluding any substantial longitudinal movement of said discs on said disc mounting means, at least two separate liquid headers formed in said device and communicating in fluid-flow relationship with said channels through spaces between said circular discs, and means adapted to supply a liquid to each of said headers.

2. A device according to claim 1 wherein said channels are formed in said discs.

3. A device according to claim 1 wherein said discs comprise a plurality of rollers discs of one diameter and a plurality of spacer discs of another diameter, a spacer disc being positioned between each adjacent two roller discs, said one diameter being greater than said other diameter, said surface being defined by the peripheral edges of said roller discs, the peripheral edges of said spacer discs defining the bottoms of said channels.

4. A device according to claim 3 in which adjacent roller discs are of different diameters providing thereby a contoured roller surface.

5. A device according to claim 3 in which the adjacent ones of said discs are of different diameters and in which the peripheral edges of said roller discs are so shaped as to provide a contoured peripheral roller surface.

6. A device for mixing and applying liquids comprising a plurality of circular discs closely stacked side by side and each having an aperture positioned centrally therein, a a shaft, said discs being individually rotatably mounted on said shaft with said shaft extending through the apertures in said discs about the longitudinal axis thereof, the diameter of said apertures being at least substantially the same as the diameter of said shaft, said discs thereby being precluded from any substantial degree of lateral movement with respect to said longitudinal axis by engagement of said shaft with the walls defining said apertures, the peripheral surface of said device remote from said shaft having a plurality of longitudinally spaced apart peripheral annular channels formed therein in every position of said discs, retaining means retaining said discs on said shaft and precluding any substantial longitudinal movement of said discs on said shaft, two separate liquid headers formed in said device and communicating in fluid-flow relationship with said channels through spaces between said circular discs, and two liquid carrying tubes, one of said tubes being connected in fluid flow relationship with one header, the other of said tubes being connected in fluid flow relationship with the other header.

7. A device according to claim 6 wherein said retaining means comprises a shoulder adjacent one end of said shaft and a cap threadably engaging the other end of said shaft.

8. A device according to claim 6 wherein said shaft has a pair of flat surfaces opposite one another, said headers being defined between said flat surfaces and parts of the walls defining said apertures.

9. A device according to claim 6 including a first passage in said shaft connecting said one header and said one tube and a second passage in said shaft connecting said other header and said other tube.

10. A device according to claim 6 including handle means associated therewith.

11. A device for mixing and applying liquids comprising a plurality of circular discs closely stacked side by side and each having an aperture positioned centrally therein, said discs comprising a plurality of roller discs and a plurality of spacer discs, a spacer disc being positioned between each pair of roller discs, said roller discs being of one diameter, said spacer discs being of another diameter less than said one diameter, a shaft of substantially the same diameter as the apertures in said discs, said discs being individually rotatably mounted on said shaft with said shaft extending through the apertures in said discs and being precluded from any substantial lateral movement with respect to the longitudinal axis of said shaft by engagement between said shaft and the walls defining said apertures, the peripheral surface of said device being defined by the peripheral edges of said roller discs, said device having a plurality of longitudinally spaced apart peripheral annular channels formed therein in every position of said discs, the peripheral edges of said spaced discs defining the bottoms of said channels, retaining means retaining said discs on said shaft and precluding any substantial longitudinal movement of said discs on said shaft, two opposite sections of said shaft being cut away to form two separate liquid headers with parts of the walls defining said apertures, two liquid carrying tubes, two liquid carrying passages in said shaft, one of said passages being connected in fluid flow relationship with one header, the other of said passages being connected in fluid flow relationship with the other header, one of said tubes being connected in fluid flow relationship with said one passage, the other of said tubes being connected in fluid flow relationship with said other passage.

References Cited in the file of this patent
UNITED STATES PATENTS

| | | |
|---|---|---|
| 189,828 | Woodcock | Apr. 17, 1877 |
| 1,463,801 | Cosgrove et al. | Aug. 7, 1923 |
| 2,778,046 | Fisher | Jan. 22, 1957 |
| 2,929,089 | Nall | Mar. 22, 1960 |